United States Patent
Poulin et al.

(10) Patent No.: US 8,155,156 B2
(45) Date of Patent: Apr. 10, 2012

(54) SYNCHRONIZATION RECOVERY FOR MULTIPLE-LINK COMMUNICATIONS

(75) Inventors: André Poulin, Gatineau (CA); Daniel Lafleur, Kanata (CA)

(73) Assignee: Alcatel Lucent, Paris (FR)

( * ) Notice: Subject to any disclaimer, the term of this patent is extended or adjusted under 35 U.S.C. 154(b) by 1033 days.

(21) Appl. No.: 11/521,690

(22) Filed: Sep. 15, 2006

(65) Prior Publication Data

US 2008/0069149 A1    Mar. 20, 2008

(51) Int. Cl.
    *H04J 3/06*      (2006.01)
(52) U.S. Cl. .................... 370/503; 370/395.1; 370/474; 709/248
(58) Field of Classification Search .............. 370/474, 370/395.7, 389, 398, 469, 241, 217, 395.1, 370/535–536; 709/248
See application file for complete search history.

(56) References Cited

U.S. PATENT DOCUMENTS

| | | | | |
|---|---|---|---|---|
| 5,875,192 | A * | 2/1999 | Cam et al. ................ | 370/395.7 |
| 6,222,858 | B1 * | 4/2001 | Counterman ............... | 370/474 |
| 6,717,960 | B1 * | 4/2004 | Anesko et al. ............. | 370/536 |
| 6,775,228 | B1 * | 8/2004 | Solana De Quesada ...... | 370/217 |
| 7,065,103 | B1 * | 6/2006 | Gagnon et al. ............. | 370/474 |
| 7,145,908 | B1 * | 12/2006 | Anesko et al. ............. | 370/395.1 |
| 2002/0122439 | A1 * | 9/2002 | Evans ......................... | 370/535 |
| 2005/0265243 | A1 * | 12/2005 | Vallee ........................ | 370/241 |

OTHER PUBLICATIONS

"Inverse Multiplexing for ATM (IMA) Specification Version 1.1", The ATM Forum Technical Committee, AF-PHY-00086.001, Mar. 1999.

* cited by examiner

*Primary Examiner* — Aung S Moe
*Assistant Examiner* — Vincelas Louis
(74) *Attorney, Agent, or Firm* — Eckert Seamans Cherin & Mellott, LLC (57) ABSTRACT

Apparatus and methods of recovering synchronization for multiple-link communications are disclosed. Streams of communication traffic on a plurality of communication links from which communication traffic is to be extracted and combined into a single communication traffic stream are monitored for receipt of synchronization information for each link. In the event that an error occurs in receipt of the synchronization information for any of the communication links, a stream received on each affected link is modified. For example, traffic may be removed from or inserted into a received stream where synchronization information for a link is received twice or received earlier than expected, respectively. If synchronization information for a link is missing, then it may be generated and inserted into the stream received on that link. In some embodiments, synchronization information includes sequence numbers, and inter-link synchronization is re-aligned to received sequence numbers when expected and received sequence numbers do not match.

18 Claims, 6 Drawing Sheets

SYNCHRONIZATION RECOVERY FOR MULTIPLE-LINK COMMUNICATIONS

FIELD OF THE INVENTION

This invention relates generally to communications over multiple communication links and, in particular, to recovery of synchronization for multiple-link communications.

BACKGROUND

Inverse Multiplexing for Asynchronous Transfer Mode (IMA), as defined in the IMA Specification Version 1.1 (AF-PHY-0086.001) published by the ATM Forum in March 1999, is one example of a multiple-link communication scheme. According to IMA, multiple physical communication links are configured into an IMA group to form a single logical or virtual link. At a transmitting end of an IMA virtual link, an ATM stream is inverse multiplexed or "split" and transmitted over the multiple links. The ATM stream is then reassembled at a receiving end from ATM cells that are received on the multiple links. IMA might be used to allow an ATM stream from a large bandwidth link to be split for transmission over lower bandwidth links such as multiple DS1 links, and subsequently reassembled for transmission on another large bandwidth link, for example. Since correct reassembly of an ATM stream requires ATM cells to be extracted from multiple links, these links must be properly synchronized.

Many communication network devices provide redundancy protection for certain components to limit the effects of failures. Switching between redundant communication ports, for example, might be handled by an Automatic Protection Switching (APS) system when a port itself fails or a communication medium through which the port communicates with a remote port degrades. Line cards and/or other components could similarly be protected through such physical redundancy and automatic switching arrangements.

When a protection switch occurs, IMA cells may be lost or duplicated. As a result of cell loss or duplication, a link in an IMA group might not maintain synchronization, which results in that link going into out of IMA frame (OIF) state, and then loss of IMA frame (LIF) state. As noted above, correct ATM stream reassembly requires all IMA links to be functioning properly, and accordingly cell loss or duplication on one link significantly affects user data traffic flowing over the IMA virtual link.

Recovery of synchronization after cell loss or duplication is not specifically addressed by the IMA Specification Version 1.1. The specification does address four different cases of problems with ICP cells, which are used for link synchronization.

As described in the IMA Specification Version 1.1, (see FIG. 19 and page 69 of the Specification), the process for IMA Frame Synchronization deals with four cases of problems with ICP cells. Those skilled in the art will be familiar with IMA frames and with ICP cells, which are used for link and group synchronization in IMA. The problem cases noted in the Specification include: ICP cell in an unexpected position in an IMA frame, ICP cell missing, ICP cell(s) invalid, and ICP cell(s) errored. Each of these conditions might result in a transition into an IMA "Hunt" state, which is one variation of link reset, to regain link synchronization. One problem with transitioning into the Hunt state, especially with a large number of links, is that it can take longer than an acceptable amount of time to achieve link synchronization. In some cases it can take several seconds to regain link synchronization.

One commercially available chipset appears to be tolerant to some cell loss, but behaves in accordance with the IMA Specification for ICP cells that are in an unexpected position in the frame, invalid, or errored. While in the IMA Sync state defined in the Specification, this chipset continually examines ICP cells for each frame. If a certain number of received consecutive ICP cells have Header Error Correction (HEC) or Cyclic Redundancy Check (CRC)-10 errors, i.e., are errored ICP cells, then the IMA Hunt state is re-entered. The Hunt state is also re-entered if a number of received consecutive ICP cells are invalid, if a non-ICP cell is received at the expected ICP cell position, or if a valid ICP cell is received at an unexpected position.

It will be apparent from the foregoing that the normal recovery mechanism used for loss of synchronization on a link of an IMA group is to reset the link. The typical reset procedure duration, on the order of a second, is not acceptable for many applications and services. Another impact of cell loss or duplication is that IMA group frame alignment is lost. This can result in data traffic being out of the correct order when it is extracted from the multiple links. Again, the usual recovery mechanism for this state is to reset the links within a group to recover alignment. Resetting all of the links in an IMA group can have an even greater impact on user traffic because the entire IMA group remains down during re-negotiation of group configuration with far end communication equipment.

Link resets may also have additional effects. For example, resetting one or all links of an IMA virtual link may cause other communication equipment that transmits traffic to or receives traffic from an IMA virtual link to reset. Network elements in a wireless communication network for which IMA virtual links are used for backhaul, for instance, might reset and thus drop calls for cellular customers in the event of an IMA link reset.

Cell loss and duplication, and the resulting loss of synchronization, may have other causes than protection switching. It should also be noted that multiple-link communication mechanisms other than IMA may be affected by synchronization loss.

Thus, there remains a need for improved synchronization recovery techniques for multiple-link communications.

SUMMARY OF THE INVENTION

Embodiments of the present invention may be used to provide a mechanism for fast recovery of IMA link synchronization and IMA group frame alignment due, for example, to cell loss or cell duplication during execution of protection switching. Protection switching time for IMA groups can thereby be greatly reduced, often achieving switching times within the APS switching standard of 60 ms.

A recovery mechanism may be provided in addition to the procedures performed in the IMA hunt state. The additional recovery mechanism may be used to initially attempt to recover synchronization when an ICP cell is received at an incorrect position in an IMA frame, when an ICP cell is missing, or when an ICP cell has an incorrect sequence number.

Some embodiments may be implemented in conjunction with other multiple-link communication schemes than IMA.

According to an aspect of the invention, there is provided a synchronization monitor operable to monitor a stream of communication traffic, on each communication link of a plurality of communication links from which communication traffic is to be extracted and combined into a single communication traffic stream, for receipt of respective synchronization information for the communication link, and a synchronization recovery module operatively coupled to the synchronization monitor and operable to determine whether an error has occurred in receipt of the synchronization information for any of the communication links, and to modify a stream of communication traffic received on a communication link responsive to an error in receipt of the synchronization information for the communication link.

The synchronization information may have an expected position in a stream of communication traffic on a communication link, in which case the synchronization recovery module may be operable to determine that an error has occurred where the synchronization information for a communication link is received at a position other than its expected position.

The communication traffic on each communication link may be arranged in respective frames, with the expected position comprising a position in each frame.

In some embodiments, the synchronization recovery module is further operable to determine whether synchronization information that is received at a position other than its expected position is leading or lagging its expected position.

The synchronization recovery module may be further operable, where synchronization information for a communication link is leading its expected position, to determine, based on an amount of communication traffic by which the synchronization information leads its expected position, an amount of communication traffic to be inserted into the communication traffic stream received on the communication link, and to modify the stream of communication traffic received on the communication link by inserting the determined amount of communication traffic into the stream.

Where synchronization information for a communication link is lagging its expected position, the synchronization recovery module may determine, based on an amount of communication traffic by which the synchronization information lags its expected position, an amount of received communication traffic to be removed from the stream of communication traffic received on the communication link, and to modify the stream of communication traffic received on the communication link by removing the determined amount of received communication traffic from the stream.

The synchronization information, as noted above, may have an expected position in a stream of communication traffic on a communication link. The synchronization recovery module may be operable to determine that an error has occurred where the synchronization information for a communication link is missing from its expected position.

The synchronization recovery module may also be operable to modify a stream of communication traffic by inserting synchronization information into the stream received on a communication link for which synchronization information is missing from its expected position. The synchronization monitor may be further operable to monitor a communication link, for which synchronization information has been inserted into a communication traffic stream, for a next receipt of synchronization information.

The synchronization information for each communication link of the plurality of communication links may include a sequence number. In this case, the synchronization recovery module may be further operable to detect an inter-link communication traffic alignment error where the sequence number in synchronization information received for a communication link differs from an expected sequence number for the communication link, and to adjust communication traffic alignment to each received sequence number based on a difference between the received sequence number and the expected sequence number for each communication link.

The plurality of communication links may comprises an IMA virtual link. The communication traffic streams are then IMA frames, and the synchronization information is in the form of ICP cells.

At least one of the synchronization monitor and the synchronization recovery module may be implemented in software for execution by one or more processing elements.

The apparatus may be implemented, for example, in an electronic circuit card for use in communication equipment. Communication equipment that includes a plurality of slots for receiving electronic circuit cards may have such an electronic circuit card installed in at least one slot of the plurality of slots.

A method is also provided, and includes monitoring a stream of communication traffic, on each communication link of a plurality of communication links from which communication traffic is to be extracted and combined into a single communication traffic stream, for receipt of respective synchronization information for the communication link, determining whether an error has occurred in receipt of the synchronization information for any of the communication links, and modifying a stream of communication traffic received on a communication link responsive to an error in receipt of the synchronization information for the communication link.

If the synchronization information has an expected position in a stream of communication traffic on a communication link, determining may involve determining whether the synchronization information for a communication link is received at a position other than its expected position.

Modifying may involve, where synchronization information for a communication link is leading its expected position, inserting an amount of communication traffic into the communication traffic stream received on the communication link.

In some embodiments, modifying involves, where synchronization information for a communication link is lagging its expected position, removing an amount of received communication traffic from the communication traffic stream received on the communication link.

The operation of determining may involve determining whether the synchronization information for a communication link is missing from its expected position, in which case modifying may involve inserting synchronization information into the stream received on a communication link for which synchronization information is missing from its expected position.

The synchronization information for each communication link of the plurality of communication links may include a sequence number. The method may then also include detecting an inter-link communication traffic alignment error where the sequence number in synchronization information received for a communication link differs from an expected sequence number for the communication link, and adjusting communication traffic alignment to each received sequence number based on a difference between the received sequence number and the expected sequence number for each communication link.

Where the plurality of communication links comprises an IMA virtual link, the communication traffic includes cells in IMA frames, and the synchronization information comprises ICP cells.

Such a method may be implemented, for example, as instructions stored on a machine-readable medium.

According to another aspect of the invention, an apparatus includes a synchronization monitor operable to monitor a stream of communication traffic, on each communication link of a plurality of communication links from which communication traffic is to be extracted and combined into a single communication traffic stream, for receipt of inter-link communication traffic alignment information for the communication link, and a synchronization recovery module operatively coupled to the synchronization monitor and operable to determine whether received inter-link communication traffic alignment information matches expected inter-link communication traffic alignment information, and to adjust communication traffic alignment on each of the communication links to the received inter-link communication traffic alignment information based on a difference between the received inter-link communication traffic alignment information and the expected inter-link communication traffic alignment information for each communication link.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
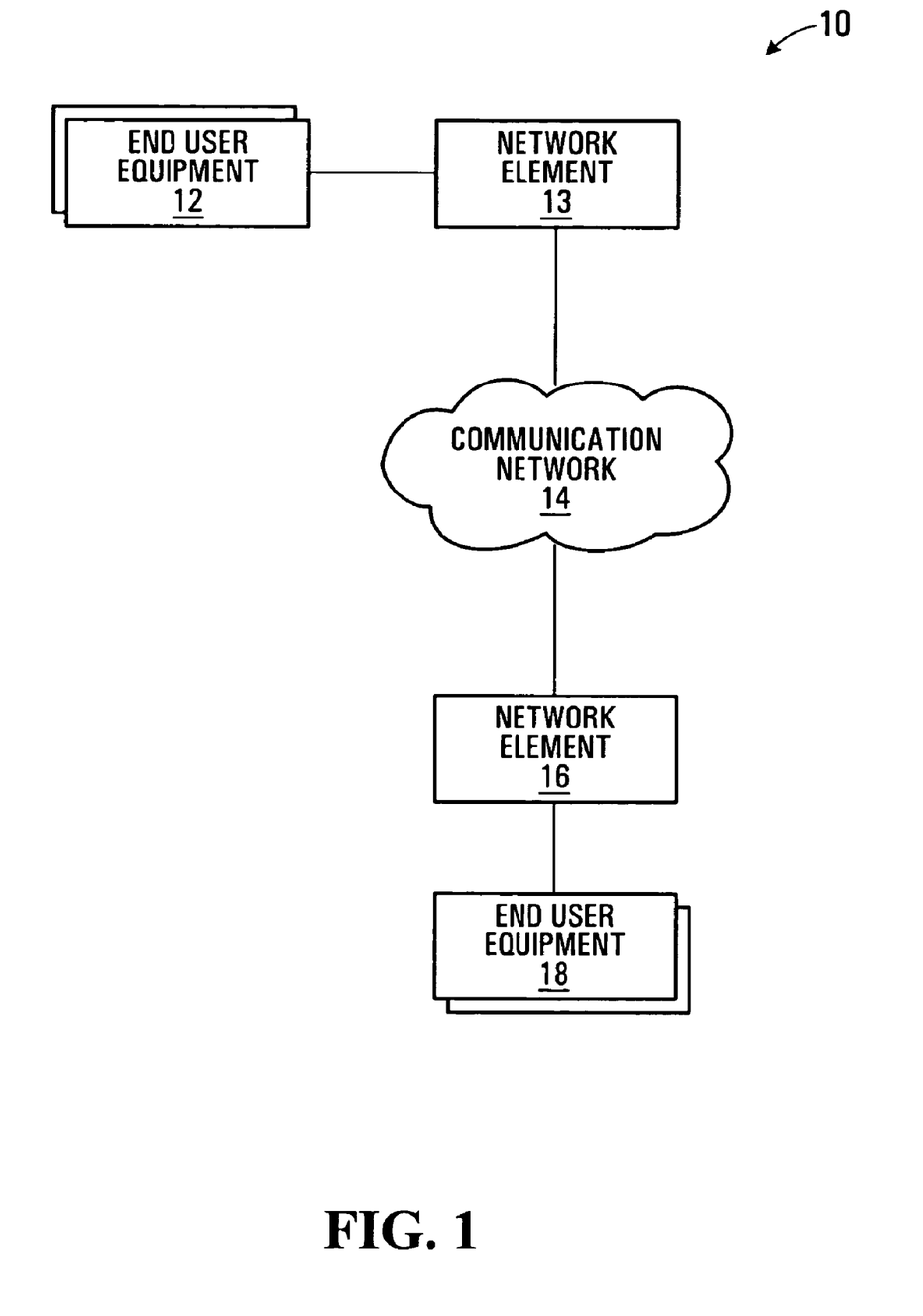
FIG. 1 is a block diagram of a communication system.

FIG. 1 is a block diagram of a communication system 10, in which some embodiments of the invention may be implemented. The communication system 10 includes end user communication equipment 12, 18, network elements 13, 16, and a communication network 14. Although many installations of end user equipment 12, 18 and network elements 13, 16 may be connected to the communication network 14, only two examples of each of these components have been labelled in FIG. 1 to avoid congestion. It should therefore be appreciated that the system of FIG. 1, as well as the contents of the other drawings, are intended solely for illustrative purposes, and that the present invention is in no way limited to the particular example embodiments explicitly shown in the drawings and described herein.

The end user equipment 12, 18 represents communication equipment that is configured to transmit and/or receive communication traffic, which may include any type(s) of information, such as data files, pictures, voice, etc. Although shown as being directly connected to the network elements 13, 16, it will be apparent that end user equipment 12, 18 may communicate with the network elements 13, 16 through other intermediate components (not shown).

Switches and routers are illustrative of the types of communication equipment represented by the network elements 13, 16. The network elements 13, 16 provide access to the communication network 14 and thus have been shown separately in FIG. 1 for illustrative purposes.

The communication network 14, in addition to the border or edge network elements 13, 16, may also include intermediate network elements that route communication traffic through the communication network 14. It should be noted that, in some embodiments, the network 14 could itself consist of the network elements 13, 16. The network elements 13, 16 may thus be edge, core, or other types of communication equipment.

Many different types of end user, access, and network communication equipment, as well as the operation thereof, will be apparent to those skilled in the art. In general, communication traffic originating with end user equipment 12, 18, and possibly other sources of communication traffic, for transfer to a destination through the communication network 14 is received by a network element 13, 16, translated between different protocols or formats if necessary, and routed through the communication network 14. Access communication links used by the network elements 13, 16 to exchange communication traffic with the end user equipment 12, 18, network communication links used for transfer of communication traffic in the communication network 14, or both, may be or include IMA virtual links. However, it should be appreciated that embodiments of the invention are not limited to any particular types of communication links, transfer mechanisms, or protocols.

One common type of installation for communication network equipment such as the network elements 13, 16 includes an equipment rack having multiple slots. The communication equipment may include hardware for supporting communications with the communication network 14 and performing general processing of communication traffic, for example. Electronic circuit cards such as line cards are then used in one or more slots to provide a medium- or protocol-specific interface. Using this kind of architecture, it tends to be easier to maintain spares for medium-specific modules in case of equipment failure, and substantially the same hardware core may be used in conjunction with various medium-specific modules. Multiple-link communications and the synchronization recovery techniques disclosed herein may be supported on electronic circuit cards in some embodiments, although other implementations are also contemplated.

Various aspects of the present invention are described herein primarily in the context of IMA as an example of a multiple-link communications mechanism. It should be appreciated, however, that the disclosed techniques may be applied to other forms or types of multiple-link communications than IMA.

Figure 2:
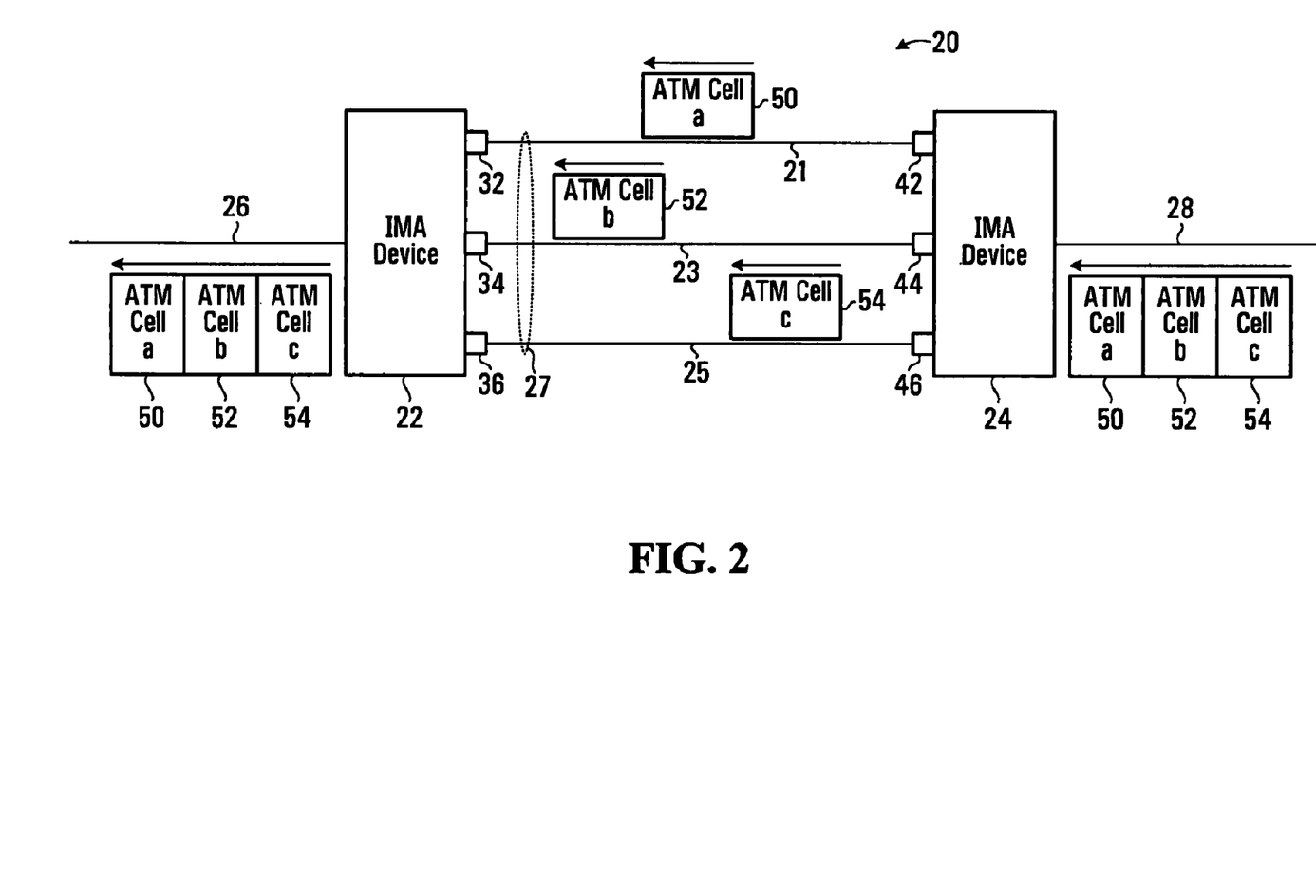
FIG. 2 is a block diagram of an IMA implementation.

Considering the illustrative example of IMA in further detail, FIG. 2 is a block diagram of an IMA implementation. The arrangement 20 shown in FIG. 2 includes two IMA devices 22, 24, which might be provided at different network elements in a communication network, for example. Two communication links 26, 28 are connected through the IMA devices 22, 24 and multiple lower-bandwidth links 21, 23, 25, which have been configured as an IMA group to operate as an IMA virtual link 27. In the arrangement 20, the communication links 21, 23, 25 are established through respective pairs of communication ports 32/42, 34/44, 36/46, as shown, which may reside on the same or different physical devices, illustratively on the same line card, at each IMA device 22, 24.

Actual IMA implementations may differ from the specific example shown in FIG. 2. For instance, an IMA virtual link may include more or fewer than three links. Where redundant protection is provided, any or all of the links of an IMA virtual link may be a working or protection link of a protection group. In addition, IMA links are often bidirectional. Transfer of communication traffic in only one direction is shown in FIG. 2 to avoid overly complicating the drawing. Other variations are also possible.

Those skilled in the art will be familiar with IMA and with various examples of IMA devices and their operation.

Accordingly, general features of IMA are described herein only to the extent necessary to illustrate embodiments of the invention.

FIG. 2 shows an ATM stream having cells 50, 52, 54 on the communication link 28. These cells are received by the IMA device 24, distributed among the links 21, 23, 25, and sent to the IMA device 22. Although a complete ATM cell is shown on each communication link 21, 23, 25 in FIG. 2, other distribution schemes may be used, to distribute to each link a block that includes only a portion of an ATM cell or a block that includes multiple ATM cells. In some implementations, different amounts of traffic may be distributed to different links in a group. Thus, in general, cells, packets, or other transmission units may be fragmented, combined, or otherwise distributed into a communication traffic stream for transfer over a communication link in a multi-link group.

The IMA device 22 extracts the cells 50, 52, 54 from the communication links 21, 23, 25 of the IMA virtual link 27, and reassembles the ATM stream for transmission on the communication link 26. The ATM cells 50, 52, 54 might be subject to different delays on the communication links 21, 23, 25, where different physical paths are used for these links for instance. Proper reassembly at the IMA device 22 relies on correct synchronization of each link 21, 23, 25 itself, as well as correct inter-link frame synchronization.

Figure 3:
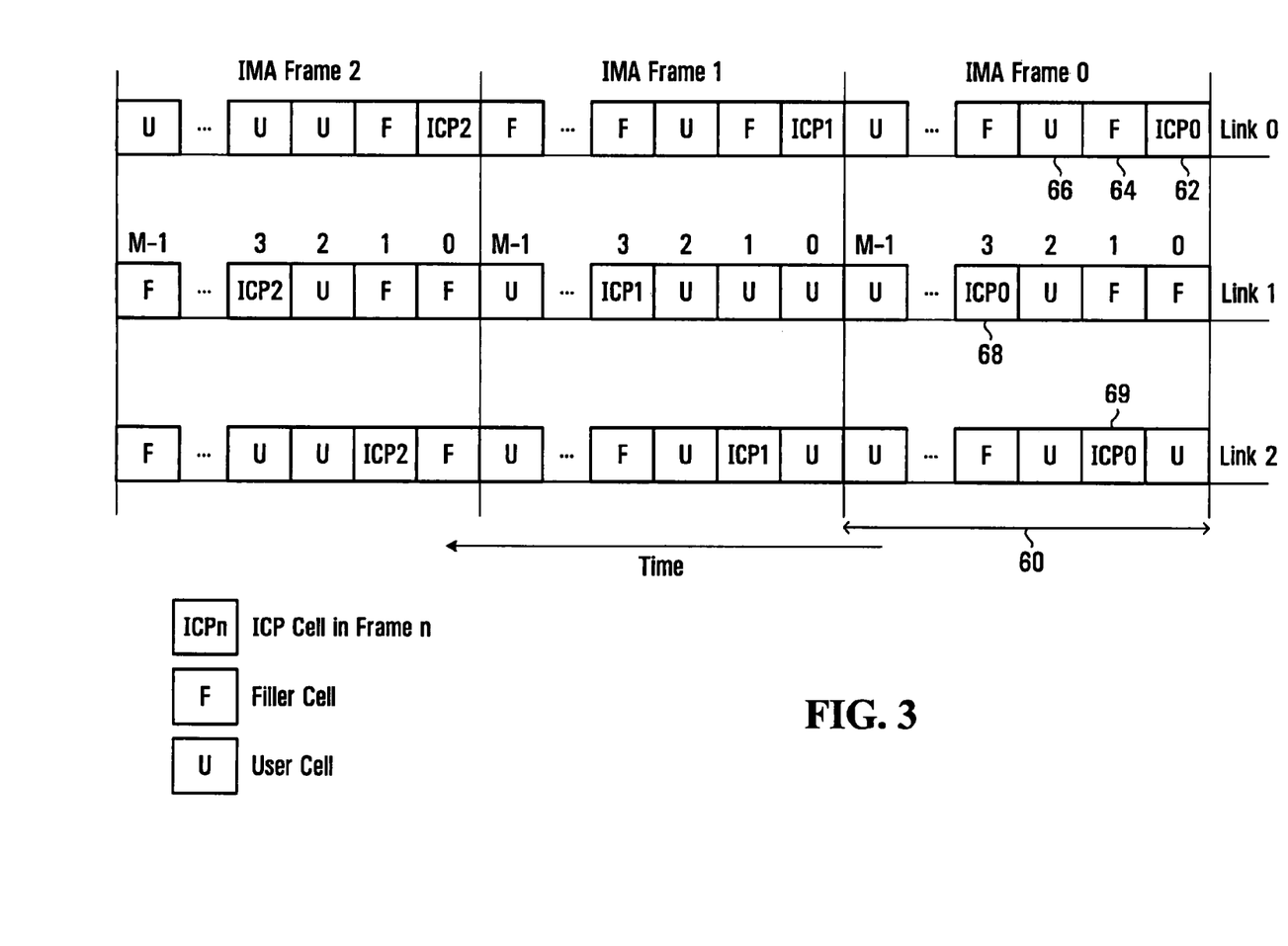
FIG. 3 is a block diagram showing IMA frame structure.

FIG. 3 is a block diagram showing IMA frame structure, and is useful to illustrate how synchronization is established for IMA virtual links. In this example, an IMA virtual link includes three communication links, labelled as Link 0, Link 1, and Link 2. Three IMA frames 60, including IMA Frame 0, IMA Frame 1, and IMA Frame 2, are shown for each of the three communication links. Each IMA frame has a length of M IMA cells, which may be filler, user, ICP, and/or ICP stuff cells. In one embodiment M is 128, although other frame lengths may be used.

IMA per-link and inter-link synchronization uses ICP cells 62, 68, 69. An IMA frame may also include user cells 66, filler cells 64, or both of these cell types. Synchronization is established and maintained at a receiving device by locating the ICP cell 62, 68, 69 in each frame. These ICP cells are inserted by a transmitting IMA device at a specific location, the ICP offset, in each IMA frame. The ICP offset is normally different for each link. The ICP offsets in FIG. 2 are set to 0 for Link 0, 3 for Link 1, and 1 for Link 2.

A cell in an IMA frame may include either or both of a cell sequence number and a frame sequence number. Cell sequence numbers allow detection of ICP cells at the ICP offset, and frame sequence numbers, which are normally included in ICP cells, allow inter-link synchronization between links of an IMA virtual link. As long as ICP cells are received in each IMA frame on each link, without errors and at the correct ICP offset for each link, the links and the IMA virtual link remain synchronized. Problems can arise, however, if an ICP cell is received on a link in a position other than its ICP offset, is missing from a frame, or includes a frame sequence number that does not match an expected frame sequence number. These conditions may be caused by cell loss, cell duplication, or improper far-end transmitting device synchronization due to protection switching, for example.

Embodiments of the present invention attempt to compensate for the loss or gain of IMA cells on an IMA link by the local insertion or discard of a number of IMA cells. A number of lost or gained cells may be inserted onto or removed from a stream of communication traffic received on a communication link, for instance.

Any or all of four cases may be addressed by embodiments of the invention, and each case is discussed in detail below. These include leading links on which ICP cells are received earlier than expected, lagging links on which ICP cells that were already received are received again, links having an unknown state due to missing ICP cells, and improper far-end transmit link synchronization.

Figure 4:
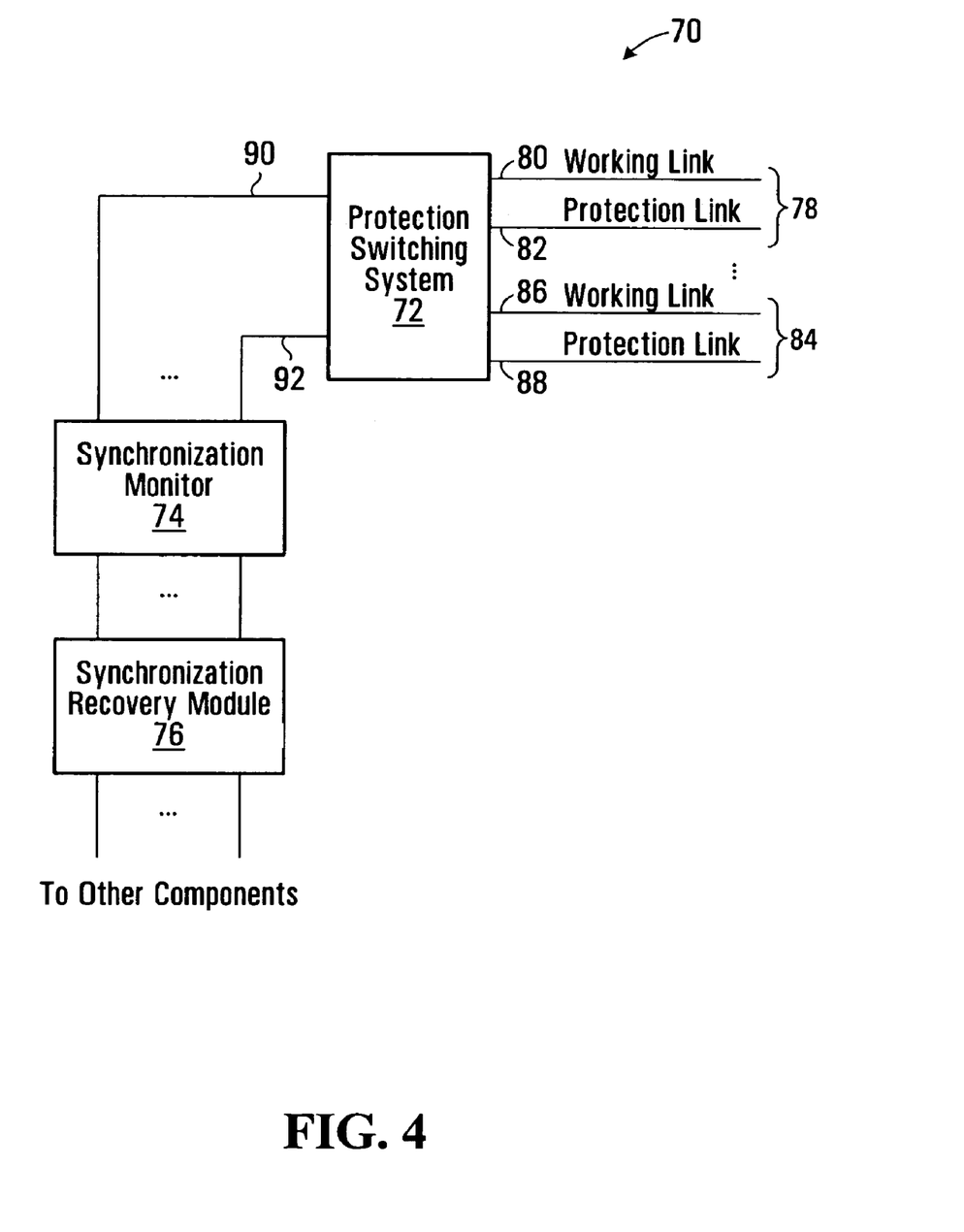
FIG. 4 is a block diagram of a synchronization recovery apparatus.

FIG. 4 is a block diagram of a synchronization recovery apparatus. The arrangement 70 includes a protection switching system 72, a synchronization monitor 74 operatively coupled to the protection switching system, and a synchronization recovery module 76 operatively coupled to the synchronization monitor. The protection switching system 72 passes communication traffic between each of the communication links 90, 92 and an active one of a working communication link 80, 86 and a protection link 82, 88 of a protection group 78, 84. A far-end arrangement (not shown) would include a corresponding protection switching system.

It should be appreciated that the particular structure shown in FIG. 4 is intended solely for the purposes of illustration, and not to limit the invention. For example, communication equipment in which or in conjunction with which an embodiment of the invention is implemented may include more or fewer components than specifically shown. Additional components might be provided between the protection switching system 72 and the synchronization monitor 74, for instance. The synchronization recovery module 76 might similarly output communication traffic received on the communication links 90, 92 to traffic processing components, as shown generally in FIG. 4. As noted above, protection switching by the protection switching system 72 and/or at a far-end device represents one possible cause, but not necessarily the only cause, of problem conditions for multiple-link communications. Thus, a protection switching system 72 might not be provided in every implementation.

Different arrangements of a synchronization monitor and recovery module are also contemplated. Where communication link protection is provided through redundant line cards or other components, for example, a synchronization monitor could be implemented on each line card. A synchronization recovery module could similarly be implemented on each line card, or a single synchronization recovery module might operate with all synchronization monitors to decide when recovery operations are needed and to carry out those recovery operations for any active links.

It would also be possible to integrate the synchronization monitor 74 and the synchronization recovery module 76 into one physical device, such as a network processor (NP) that executes micro-code. References to these components should thus be interpreted accordingly.

It should therefore be apparent that embodiments of the invention may be implemented using further, fewer, or different components than explicitly shown, with similar or different interconnections.

The types of connections through which the components of FIG. 4 are operatively coupled may, to at least some extent, be implementation-dependent. Communication equipment components often use various types of physical connectors and wired connections such as midplane and backplane conductors, although the present invention is in no way limited to wired connections. In the case of cooperating software functions, for example, an operative coupling may be through variables or registers, and thus be more so a logical coupling than a direct physical coupling.

The protection switching system 72, as noted above, transfers communication traffic between each of the links 90, 92, illustratively links in an IMA group, and an active link in a protection group 78, 84. As shown, each protection group 78, 84 includes a working link 80, 86 and a protection link 82, 88.

Various forms of such a protection system and the operation thereof will be apparent to those skilled in the art.

The synchronization monitor 74 and the synchronization recovery module 76 detect and attempt to correct synchronization problems affecting the communication links 90, 92, which have been configured to operate as a single multiplexed virtual communication link. These components may be implemented using hardware, firmware, software for execution by one or more processing elements, or some combination thereof. Any or all of devices such as NPs, microprocessors, microcontrollers, programmable logic devices (PLDs), Field Programmable Gate Arrays (FPGAs), Application Specific Integrated Circuits (ASICs), and other types of "intelligent" integrated circuits may be suitable for this purpose. According to one particular embodiment noted above, the synchronization monitor 74 and the synchronization recovery module 76 are implemented in an NP. Implementations using different types of components are also contemplated. An FPGA-based synchronization monitor 74 might transfer received communication traffic to an NP-based synchronization recovery module 76, for instance.

Given the many possible options for implementing the synchronization monitor 74 and the synchronization recovery module 76, these components are described herein primarily in terms of their functions. Based on the functional descriptions, a person skilled in the art will be enabled to implement synchronization recovery techniques according to embodiments of the invention in any of various ways.

In operation, the synchronization monitor 74 monitors communication traffic streams on each of the communication links 90, 92 for receipt of synchronization information for the communication link. Synchronization information may be provided in specialized synchronization traffic blocks, such as ICP cells, or in traffic blocks that include other information in addition to synchronization information. Where the links 90, 92 form part of an IMA virtual link, received traffic streams include IMA cells in IMA frames, with synchronization information being provided in ICP cells.

The synchronization recovery module 76 determines whether an error has occurred in receipt of synchronization information for any of the communication links 90, 92, and if so, modifies a stream of communication traffic that was received on any affected communication links.

Synchronization information receipt error determination may be performed by the synchronization monitor 74 and the synchronization recovery module 76 in any of various ways. For example, the synchronization monitor 74 might signal the synchronization recovery module 76 when it detects an ICP cell that is not at the proper offset for its link. The synchronization recovery module 76 then determines that an error has occurred whenever it receives such a signal from the synchronization monitor 74. The determination of ICP cell position relative to ICP offset could instead be made by the synchronization recovery module 76. In this case, the synchronization monitor 74 could be configured to report all ICP cell detections to the synchronization recovery module 76, which then decides whether the ICP cell was received at the correct offset.

A synchronization information position error, in which synchronization information for a communication link is received at a position other than its expected position, represents one form of receipt error that could affect the synchronization of multiple-link communications. Incorrect position conditions include leading and lagging links.

In an IMA leading link condition, a next ICP cell including a frame sequence number of a next expected frame is received before the correct ICP offset position for the next frame. This could be caused by a protection switch during which IMA cells are lost or when a newly active link is leading the previously active link. The newly active link might have a shorter delay than the previously active link, for example. An ICP cell thus arrives before it is expected on a link.

With reference to FIG. 4, the synchronization monitor 74 detects the arrival of the next ICP cell, and either the synchronization monitor or the synchronization recovery module 76 determines that the ICP cell has arrived before its expected position. The synchronization recovery module 76 then compensates for the early arrival by modifying the stream of traffic on the affected link. In the case of a leading link, IMA filler cells are inserted into the traffic stream, which effectively move the ICP cell back into the expected position. This recovery keeps the link in synchronization provided the next subsequent ICP cell following the early ICP cell arrives at the expected position, i.e., the ICP offset. This case also handles the loss of cells due to failures in transfer of traffic to a receiving device, through a working and/or protection link in a transport network for instance.

The manner in which IMA cell insertion is accomplished may vary between embodiments of the invention. Where the speed of a processor in which the synchronization recovery module 76 exceeds the data speed on a communication link, for example, the processor may have sufficient time between consecutive cells to insert the appropriate number of cells to correct the leading link condition. In some cases, traffic could be buffered while the additional cells are inserted.

It should be noted that IMA cell insertion processing could be distributed in time. For example, an NP or other component that performs IMA cell insertion processing might suspend the insertion processing to perform another function, and then resume the insertion processing. In this manner, insertion processing does not necessarily block other functions or processes.

IMA cells are inserted into contiguous cell positions in an IMA frame in some embodiments. It may also be possible to insert IMA cells into non-contiguous positions. If four IMA filler cells are to be inserted into a stream on a leading communication link for instance, the synchronization recovery module 76 might output two of the four extra filler cells and then detect that an IMA filler cell has been received on the link. The received IMA filler cell could then be output, followed by the remaining two extra filler cells, and then the rest of the stream as received.

On a lagging link, an ICP cell that is received at the correct ICP offset is received again. Suppose that a protection switch is executed for Link 2 in FIG. 3 after the cell at position 3 of Frame 1 has been received, and that after the switch, the cell at position 1 of Frame 1 is being received on the protection link for Link 2, due to longer delay on the protection link for instance. In this case, extra cells are received after the switch since the newly active link is behind (lagging) the previous active link. Specifically, ICP1 and the cells at positions 2 and 3 of Frame 1 are the extra cells in this example. To detect the lagging state, the synchronization monitor 74 (FIG. 4) detects the receipt of ICP1 on the newly active protection Link 2 after it was already received on working Link 2. The synchronization recovery module 76 removes the extra cells from the link to maintain synchronization. The second ICP1 cell and the cells at positions 2 and 3 of the frame are dropped in the above example, and normal flow resumes after the cell at position 3. This maintains the link in synchronization as long as the next ICP cell arrives at the expected offset. Any of filler, user, ICP, and ICP stuff cells, described below, may be dropped.

The number of cells (N), or more generally the amount of communication traffic, to be inserted into or removed from a communication traffic stream may be determined by the synchronization recovery module 76 based on cell and/or frame sequence numbers. In one embodiment, each frame contains 128 cells, and the calculation of N takes into account cell sequence number "wraparound" where recovery from errors affecting multiple frames is to be supported. Multiple frame support may be desirable even for fast recovery times, within the 60 ms APS switching specification for instance. A 60 ms lead or lag could be almost 2 IMA frames at a DS1 rate or almost 3 IMA frames at an E1 rate.

In a missing or unknown state, synchronization information, which is provided in an ICP cell for IMA links, was lost or corrupted. The synchronization monitor 74 might signal the synchronization recovery module 76 when it does not detect receipt of a valid ICP cell without errors at the ICP offset for each link 90, 92. The synchronization recovery module 76 might detect this condition itself, if it fails to receive an ICP cell receipt confirmation from the synchronization monitor 74 at each ICP offset. Under the missing ICP cell condition, the synchronization recovery module 76 modifies a traffic stream that was received on an affected link by inserting a dummy ICP cell into the received traffic stream at the correct ICP offset, so as to maintain synchronization or alignment. On the next ICP cell reception, a determination is made as to whether the affected link is in a normal state, a leading state, or a lagging state. Leading or lagging state can then be corrected as described above. In some embodiments, the missing state may be maintained for a certain number of frames when no ICP cells are received.

A protection switch or other operation may result in improper far-end transmit link synchronization. A far-end transmitting device may have performed a protection switch but did not have the transmit links of newly active equipment synchronized with the links of the previously active equipment. Frame sequence numbering, an example of inter-link alignment information, is then not as expected at the receiving device, and may be outside the APS switching time standard of 60 ms. As noted above, 60 ms represents almost 2 IMA frames for DS1 rates, and almost 3 IMA frames for E1 rates.

Another recovery mechanism may be provided for this state. In the event that ICP cells are also delayed, duplicated, or lost, the above fast link recovery operations may first be performed for each link. According to one embodiments leading and lagging procedures are configured to attempt synchronization recovery when a link is leading or lagging by up to a maximum amount, and the following procedure is initiated in the event that a link is leading or lagging by greater than the maximum amount.

A frame sequence number delta, i.e., the difference between the expected frame sequence number and the new sequence number on the links, is calculated for each link. Frame alignment of the IMA group is maintained by re-aligning the group sequence number to the new frame sequence number of the links using the delta value. This adjusts the alignment of frames based on the difference between the expected and received frame sequence numbers. Sequence numbers may be re-aligned, for example, by subtracting the sequence number delta from received sequence numbers, or by adding the sequence number delta to expected sequence numbers.

Although in this example all links have the same frame sequence number delta, other embodiments may provide for recovery from this type of inter-link communication traffic alignment error on a per-link basis.

It should be noted that the recovery operations disclosed herein are performed at the reception end of a multiple-link virtual communication link, before traffic is extracted from the links. Far-end equipment is thus not aware of or affected by this form of synchronization recovery.

In any of the above cases, if the fast recovery/alignment process fails, then a failure indication can be provided to other components. These other components could then perform other recovery operations, in accordance with the IMA Frame Synchronization Mechanism (IFSM) defined in the IMA Specification Version 1.1 for instance. The failure processing might be dependent on the first failure that occurred. Different failures might result in different subsequent recovery procedures being initiated.

Figure 5:
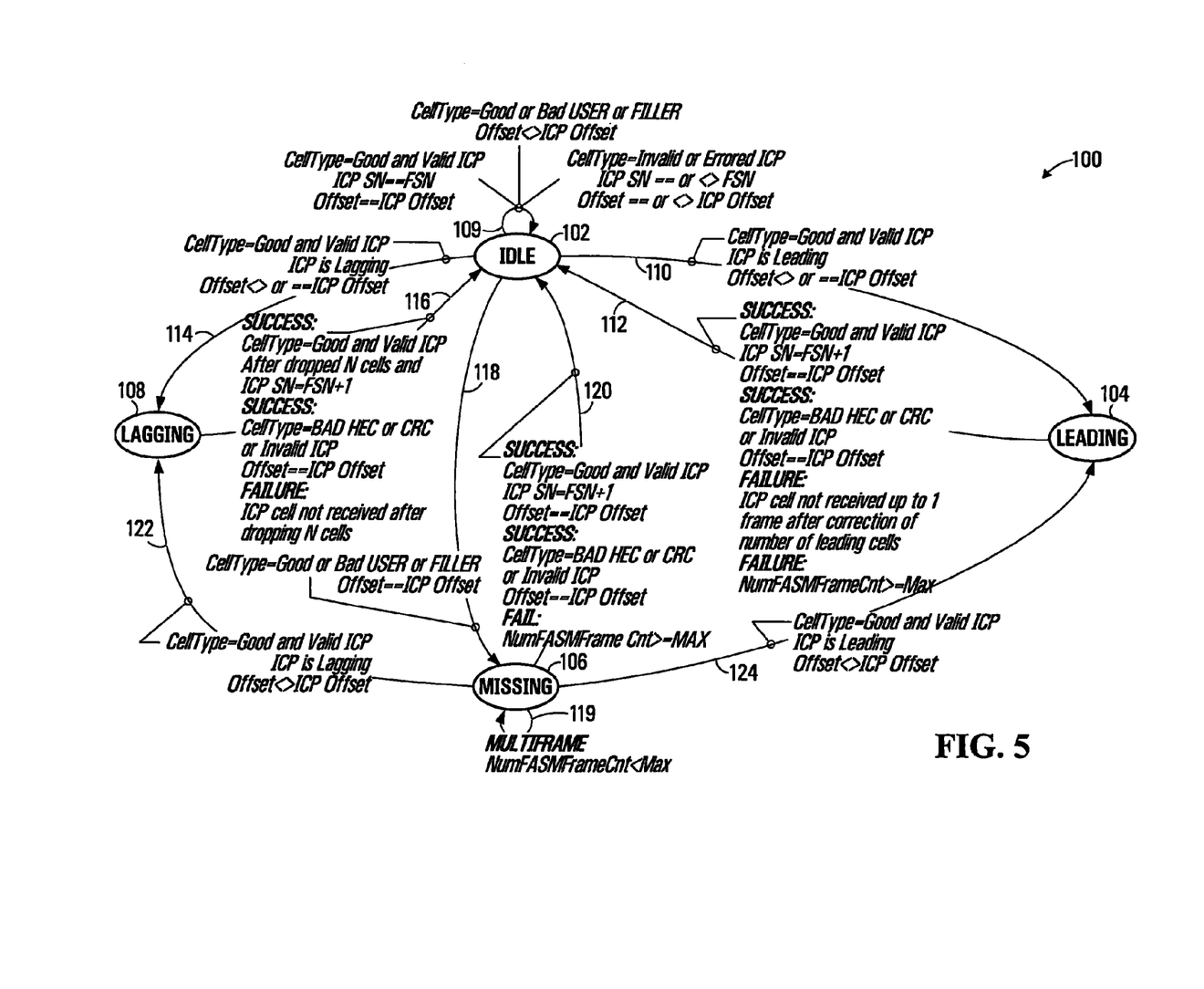
FIG. 5 is a state diagram illustrating a synchronization recovery technique.

Although described above primarily in the context of an apparatus with reference to FIG. 4, embodiments of the invention may also or instead be implemented in the form of methods. FIG. 5 is a state diagram illustrating a synchronization recovery technique, and also reflects operations that may be performed in a synchronization state recovery method.

The state diagram 100 includes four states. A synchronization recovery mechanism remains in the idle state 102 when conditions are normal. No transition is made from the idle state, as indicated at 109, as long as an ICP cell that has the correct frame sequence number (FSN) is received at the correct offset or other types of cells are received at positions other than the ICP offset. The idle state 102 may also be maintained under conditions that are not handled by the recovery mechanism. An invalid or errored ICP cell is handled by normal IMA processing in the example shown, and in this case the illustrated recovery mechanism remains in the idle state 102.

During the idle state 102, communication traffic is being monitored for ICP cells, which as noted above are an example of synchronization information. A leading link condition causes a transition 110 to the leading state 104. The operations performed in this state have been described above for a leading link, and could be implemented in software code that reflects the following operations:

```
Find L = number of cells by which the link is leading
in this frame sequence
If L > M−1 then
    Insert Modulo M of L filler cells
    Insert a Dummy ICP cell with SN = FSN
    NumFASMFrameCnt + 1
    Go back to IDLE state
Else
    Insert L Filter cells
    Forward this ICP cell
    Stay in Leading state
end if
```

In the above example, where L is greater than the length of a frame (M) minus one, a dummy ICP cell is inserted after L modulo M filler cells. This avoids an ICP cell error where lost or duplicated cells span multiple frames, since the dummy ICP cell, and not the original early ICP cell, includes the correct FSN as its sequence number (SN). Although the dummy ICP cell includes the correct SN, it might otherwise be the same as the original early ICP cell, which could be kept so as not to lose state information from that cell. In some embodiments, the dummy ICP cell is generated using state from the original early ICP cell. The dummy ICP cell could instead be a copy of the early ICP cell but with a new sequence number.

The early received ICP cell is forwarded where L<M−1, i.e., for single-frame synchronization errors.

NumFASMFrameCnt is a counter of the number of frames that have elapsed so far during a recovery process, also referred to herein as the Fast Alignment Synchronization Mechanism (FASM). This counter is used to support a multiple-frame recovery. The maximum value MAX of this counter might be set depending on the physical link rate. For 60 ms recovery time, MAX could be set to 3 for DS1 or 4 for E1, for example. This counter may be reset, for example, after a return to idle state 102.

Success and failure conditions for returning to the idle state 102 are shown on the transition arrow 112. Synchronization has been recovered when an ICP cell having the expected FSN is received at the ICP offset of the next frame. It may also be desirable to allow an errored or invalid ICP cell to be considered a success if the cell is received at the ICP offset, as shown. A failure is declared if an ICP cell is not received at the ICP offset up to one frame after correction of L leading cells. In the multi-frame case, the FASM may return to the idle state when MAX frames have elapsed during recovery. As noted in the example provided above, the FASM may also return to the idle state 102 where L>M−1, after a dummy ICP cell has been inserted.

A transition 114 from the idle state 102 to the lagging state 108 is made when an ICP cell that has already been received is received again. Software code implementing the following operations could be used in some embodiments to provide lagging state functions:

---
Find N = number of cells received since the last ICP
cell with SN = X and this ICP cell with SN = X
Drop this ICP cell with SN = X
Drop the next N received cells.

---

In a multi-frame implementation of the above example, N can be greater than M but less than the total cell length of NumFASMFrameCnt MAX number of frames (i.e., MAX*M).

The return transition 116 to the idle state 102 is made with successful recovery if an ICP cell, or possibly an errored or invalid ICP cell, is correctly received at the ICP offset of the next frame. A failure is returned if the next ICP cell is not received when expected. In the multi-frame case, a failure could be returned when NumFASMFrameCnt reaches or exceeds its maximum value.

A missing ICP cell, that is, receipt of another type of cell at an ICP offset, causes the transition 118 from the idle state 102 to the missing state 106. In this state, a dummy ICP cell with the expected FSN is inserted into a traffic stream that is received on a link, and NumFASMFrameCnt is incremented in the multi-frame case. The FASM remains in the missing state 106 until the next ICP offset, or for MAX frames in the multi-frame case. One of the transitions 120, 122, 124 is made on receipt of a next ICP cell, depending on whether the ICP cell was lagging, leading, or received at the ICP offset, respectively. As shown, and as discussed above for the leading and lagging states, receipt of an errored or invalid ICP cell received at the ICP offset may be declared a success. A failure is declared if an ICP cell is not received within MAX frames for the multi-frame case.

When a failure return transition is made to the idle state 102, other recovery operations may be attempted, as noted above.

The state diagram 100 and the underlying method illustrated in FIG. 5 are indicative of one embodiment of the invention. Other embodiments may include further, fewer, or different operations than those explicitly shown. For instance, a large frame sequence number delta might not be handled in the same manner as a leading or lagging condition that spans several IMA frames. A transition could be made back to the idle state 102, and/or to a different recovery mechanism (not shown), from the leading state 104 or the lagging state 108 when L or N is greater than the length of NumFASMFrameCnt frames, i.e., where L/M>NumFASMFrameCnt or N/M>NumFASMFrameCnt.

Some embodiments of the invention may entail adjustments to normal procedures defined in the IMA Specification Version 1.1. For example, during a fast re-alignment procedure, Loss of Delay Synchronization (LODS) might be suspended until the alignment is completed and stable for at least 1 frame. Some links might be behind or ahead of the reference link during recovery, in which case normal LODS detection could falsely declare a LODS condition.

Figure 6:
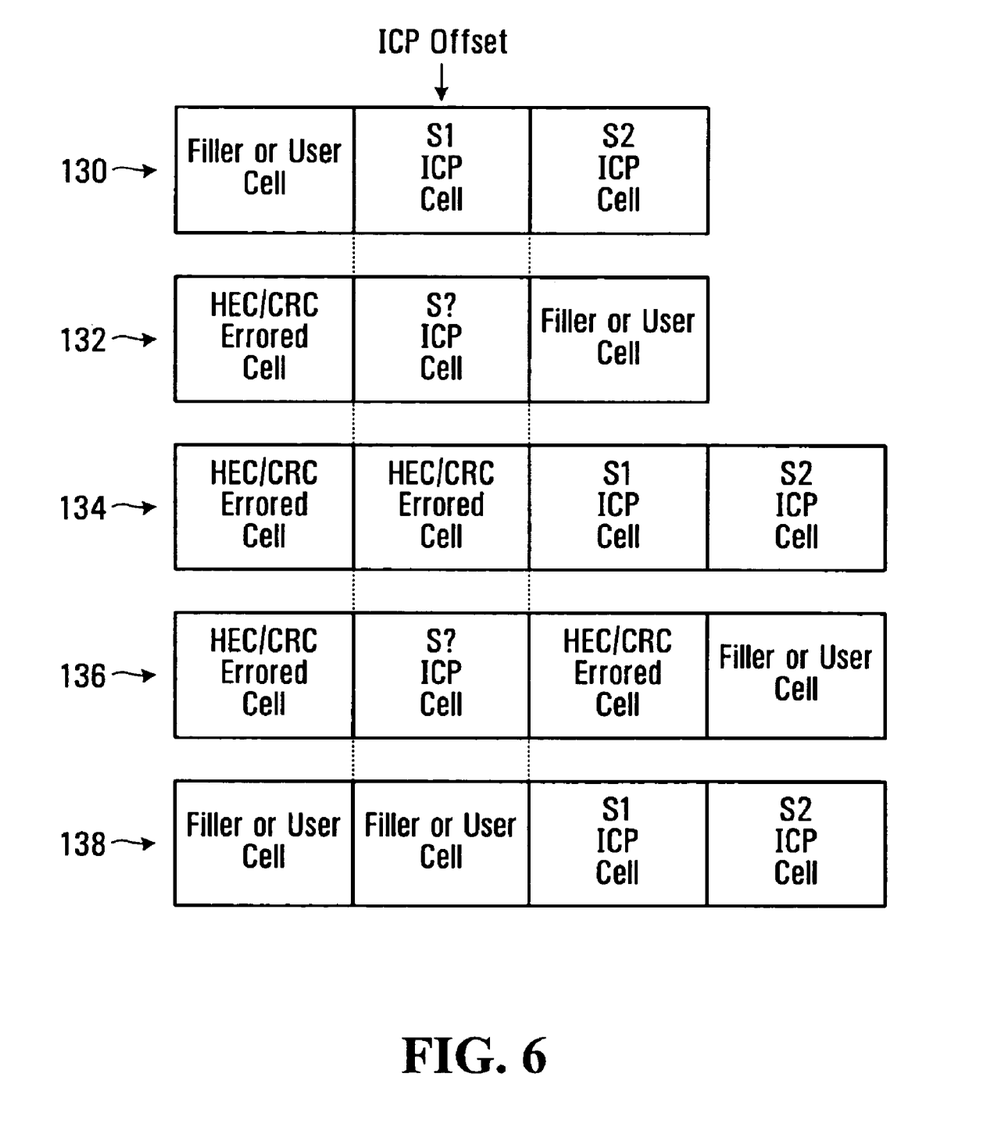
FIG. 6 is a block diagram showing stuff ICP cell and error scenarios in an IMA stream.

During the fast re-alignment procedure, stuff ICP cells should also be handled properly. Stuff ICP cells as used in IMA Common Transmit Clock (CTC) mode are duplicate ICP cells that are periodically inserted into IMA frames, once every 2048 cells. FIG. 6 is a block diagram showing stuff ICP cell and error scenarios in an IMA stream. Other IMA modes, such as Independent Transmit Clock (ITC) mode, and other multi-link protocols than IMA may have different scenarios than specifically shown, which may be handled in a similar or different manner.

In FIG. 6, 130 represents the normal case, in which both of the ICP cells in a stuffed frame, designated S1 (stuff 1) and S2 (stuff 2), are received. Either of S1 and S2 can be discarded. In one embodiment, the first received ICP stuff cell is always discarded and the link is synchronized using S2. Normal operation continues since in this case an ICP cell was received at the ICP offset.

At 132, a stuff ICP cell is received at the ICP offset after an errored cell. The S? cell cannot be distinguished as S1 or S2 since the preceding cell was errored. Since the S? cell is preceded by an errored cell and followed by a filler or user cell, an assumption can be made that the S? cell is S2. As noted above, in one embodiment, the first received ICP stuff cell S? is discarded. The next received cell is not an ICP cell, and therefore the missing ICP state is entered and proceeds as described above.

The cell stream at 134 may also cause missing ICP cell procedures to be performed, since the cell received at the ICP offset includes a HEC or CRC error. S1 is then discarded, and a leading/lagging determination is made based on S2.

In the stream shown at 136, a HEC or CRC errored cell is received before and after an ICP stuff cell, which could be S1 or S2. Either the errored cell preceding the ICP offset or the errored cell following the ICP offset is the second stuff ICP cell. The S? cell is dropped and the errored cell following the S? cell can then be treated as an ICP cell in accordance with normal IMA Specification procedures.

When a stream having the pattern shown at 138 is received, a filler or user cell is at the ICP offset followed by the two stuff ICP cells S1 and S2. In this case, the missing state is entered at the ICP offset, S1 is dropped, and a transition is made into leading or lagging state based on processing of S2.

Embodiments of the invention disclosed herein do not require any modifications of transmitting IMA equipment. A recovery mechanism may be implemented entirely at a receiving device. An IMA transmitter need not even be aware that a recovery process is under way.

Faster recovery times, on the order of APS 60 ms switching times, may be provided for IMA applications. Recovery times could in some embodiments be slower than APS switching times, but still faster than recovery procedures provided in current IMA Specifications. Such fast recovery is not addressed by the current IMA Specifications.

IMA is a very popular technology in wireless networks for connecting wireless base stations to radio network controllers (RNCs). Outages in this network are highly undesirable due to end customer impact. Embodiments of the invention can be implemented in conjunction with such networks.

What has been described is merely illustrative of the application of principles of embodiments of the invention. Other arrangements and methods can be implemented by those skilled in the art without departing from the scope of the present invention.

For example, the recovery mechanisms disclosed herein may provide for synchronization recovery due to cell loss or duplication, whether due to protection switching or other causes.

IMA has been described as an illustrative example of a multi-link communication scheme. The present invention is in no way limited to IMA or any other type of multiple-link communications. MultiLink Point-to-Point Protocol (MLPPP) is another multiple-link scheme to which embodiments of the invention could be applied.

Similarly, the invention is not restricted to multiple-link schemes in which separate physical links are used. Groups of different logical communication links that behave as a single link may also be prone to the same synchronization problems as noted above, and thus may benefit from the recovery techniques disclosed herein or variations thereof.

The divisions of functions shown in the drawings and described above are intended to be illustrative and non-limiting. Embodiments of the invention may be implemented using further, fewer, or different functional elements than considered above.

In addition, although described primarily in the context of methods and systems, other implementations of the invention are also contemplated, as instructions stored on a machine-readable medium for example.

We claim:

1. An apparatus comprising:
a synchronization monitor to monitor a stream of communication traffic, on each communication link of a plurality of communication links from which communication traffic is to be extracted and combined into a single communication traffic stream, for receipt of respective synchronization information for the communication link, the synchronization information having an expected position in a stream of communication traffic on a communication link; and
a synchronization recovery module operatively coupled to the synchronization monitor, to determine that an error has occurred in receipt of the synchronization information for a communication link where the synchronization information for the communication link is received at its expected position and is received again at a position lagging its expected position, to determine, based on an amount of communication traffic by which the position lags the expected position, an amount of communication traffic, in the stream of communication traffic received on the communication link, which was previously received on the communication link and is received again on the communication link, and, responsive to the error, to modify the stream of communication traffic received on the communication link by removing the determined amount of received communication traffic from the stream,
at least one of the synchronization monitor and the synchronization recovery module being implemented using hardware.

2. The apparatus of claim 1, wherein the communication traffic stream on each communication link is arranged in respective frames, and wherein the expected position comprises a position in each frame.

3. The apparatus of claim 1, wherein the synchronization recovery module is further operable to determine that an error has occurred where the synchronization information for a communication link is received at a position leading its expected position, to determine, based on an amount of communication traffic by which the synchronization information leads its expected position, an amount of communication traffic to be inserted into the communication traffic stream received on the communication link, and to modify the stream of communication traffic received on the communication link by inserting the determined amount of communication traffic into the stream.

4. The apparatus of claim 1, wherein the synchronization recovery module is further operable to determine that an error has occurred where the synchronization information for a communication link is missing from its expected position.

5. The apparatus of claim 4, wherein the synchronization recovery module is operable to modify a stream of communication traffic by inserting synchronization information into the stream received on a communication link for which synchronization information is missing from its expected position.

6. The apparatus of claim 5, wherein the synchronization monitor is operable to monitor a communication link, for which synchronization information has been inserted into a communication traffic stream, for a next receipt of synchronization information.

7. The apparatus of claim 1, wherein the synchronization information for each communication link of the plurality of communication links comprises a sequence number, and wherein the synchronization recovery module is further operable to detect an inter-link communication traffic alignment error where the sequence number in synchronization information received for a communication link differs from an expected sequence number for the communication link, and to adjust communication traffic alignment to each received sequence number based on a difference between the received sequence number and the expected sequence number for each communication link.

8. The apparatus of claim 1, wherein the plurality of communication links comprises an Inverse Multiplexing for Asynchronous Transfer Mode (IMA) virtual link, wherein the communication traffic streams comprise cells in IMA frames, and wherein the synchronization information comprises ICP cells.

9. The apparatus of claim 1, wherein at least one of the synchronization monitor and the synchronization recovery module comprises one or more processing elements.

10. An electronic circuit card for use in communication equipment, the card comprising:
the apparatus of claim 1.

11. Communication equipment comprising:
a plurality of slots for receiving electronic circuit cards; and
the electronic circuit card of claim 10 installed in at least one slot of the plurality of slots.

12. A method comprising:
monitoring, by a synchronization monitor, a stream of communication traffic, on each communication link of a plurality of communication links from which communication traffic is to be extracted and combined into a single communication traffic stream, for receipt of respective synchronization information for the communication link, the synchronization information having an expected position in the stream of communication traffic on each communication link;
determining, by a synchronization recovery module operatively coupled to the synchronization monitor, whether an error has occurred in receipt of the synchronization information for any of the communication links, the determining comprising determining that an error has occurred where the synchronization information for a communication link is received at its expected position and is received again at a position lagging its expected position;

determining, by the synchronization recovery module, based on an amount of communication traffic by which the position lags the expected position, an amount of communication traffic, in the stream of communication traffic received on the communication link, which was previously received on the communication link and is received again on the communication link; and modifying, by the synchronization recovery module, the stream of communication traffic received on the communication link responsive to the error in receipt of the synchronization information for the communication link, the modifying comprising removing the determined amount of received communication traffic from the communication traffic stream, at least one of the synchronization monitor and the synchronization recovery module being implemented using hardware.

13. The method of claim 12, further comprising:
determining that an error has occurred where the synchronization information for a communication link is received at a position leading its expected position,
wherein modifying comprises, where the synchronization information for the communication link is leading its expected position, inserting an amount of communication traffic into the communication traffic stream received on the communication link.

14. The method of claim 12, wherein determining further comprises determining whether the synchronization information for a communication link is missing from its expected position, and wherein modifying further comprises inserting synchronization information into the stream received on a communication link for which synchronization information is missing from its expected position.

15. The method of claim 12, wherein the synchronization information for each communication link of the plurality of communication links comprises a sequence number, the method further comprising:
detecting an inter-link communication traffic alignment error where the sequence number in synchronization information received for a communication link differs from an expected sequence number for the communication link; and
adjusting communication traffic alignment to each received sequence number based on a difference between the received sequence number and the expected sequence number for each communication link.

16. The method of claim 12, wherein the plurality of communication links comprises an Inverse Multiplexing for Asynchronous Transfer Mode (IMA) virtual link, wherein the communication traffic streams comprise cells in IMA frames, and wherein the synchronization information comprises ICP cells.

17. A non-transitory machine-readable medium storing instructions which when executed perform a method comprising:
monitoring a stream of communication traffic, on each communication link of a plurality of communication links from which communication traffic is to be extracted and combined into a single communication traffic stream, for receipt of respective synchronization information for the communication link, the synchronization information having an expected position in the stream of communication traffic on each communication link;

determining whether an error has occurred in receipt of the synchronization information for any of the communication links, the determining comprising determining that an error has occurred where the synchronization information for a communication link is received at its expected position and is received again at a position lagging its expected position;

determining based on an amount of communication traffic by which the position lags the expected position, an amount of communication traffic, in the stream of communication traffic received on the communication link, which was previously received on the communication link and is received again on the communication link; and modifying the stream of communication traffic received on the communication link responsive to the error in receipt of the synchronization information for the communication link, the modifying comprising removing the determined amount of received communication traffic from the communication traffic stream.

18. An apparatus comprising:
a synchronization monitor to monitor a stream of communication traffic, on each communication link of a plurality of communication links from which communication traffic is to be extracted and combined into a single communication traffic stream, for receipt of respective synchronization information for the communication link, the synchronization information having an expected position in a stream of communication traffic on a communication link; and
a synchronization recovery module operatively coupled to the synchronization monitor, to determine that an error has occurred in receipt of the synchronization information for a communication link where the synchronization information for the communication link is received at its expected position and is received again at a position lagging its expected position; to determine, based on an amount of communication traffic by which the position lags the expected position, an amount of communication traffic, in the stream of communication traffic received on the communication link, which was previously received on the communication link and is received again on the communication link; responsive to the error, to modify the stream of communication traffic received on the communication link by removing the determined amount of received communication traffic from the stream; to detect an inter-link communication traffic alignment error where a sequence number in the synchronization information received for a communication link differs from an expected sequence number for the communication link, and to adjust communication traffic alignment on each of the communication links to each received sequence number based on a difference between the received sequence number and the expected sequence number for each communication link, at least one of the synchronization monitor and the synchronization recovery module being implemented using hardware.

\* \* \* \* \*